United States Patent [19]
Morgan

[11] 3,726,133
[45] Apr. 10, 1973

[54] FLEXIBLE TORQUE TRANSMITTING UNIT

[75] Inventor: John D. Morgan, Speedway, Ind.

[73] Assignee: General Motors Corporation, Detroit, Mich.

[22] Filed: July 13, 1971

[21] Appl. No.: 162,164

[52] U.S. Cl. ................................73/118, 64/15 C
[51] Int. Cl. ...........................................G01m 13/02
[58] Field of Search ........................73/118; 64/15 C, 64/27 C

[56] References Cited
UNITED STATES PATENTS

| | | | |
|---|---|---|---|
| 3,501,929 | 3/1970 | Kashmerick | 64/27 C |
| 2,274,154 | 2/1942 | Morgan et al. | 64/15 C |

*Primary Examiner*—Jerry W. Myracle
*Attorney*—W. E. Finken et al.

[57] ABSTRACT

This power transmitting unit has concentrically arranged helical springs drivingly connecting input and output members. The springs selectively windup in response to counterclockwise or clockwise torque applied to the input to simulate the torsional deflection in a vehicle drive line.

7 Claims, 3 Drawing Figures

PATENTED APR 10 1973
3,726,133
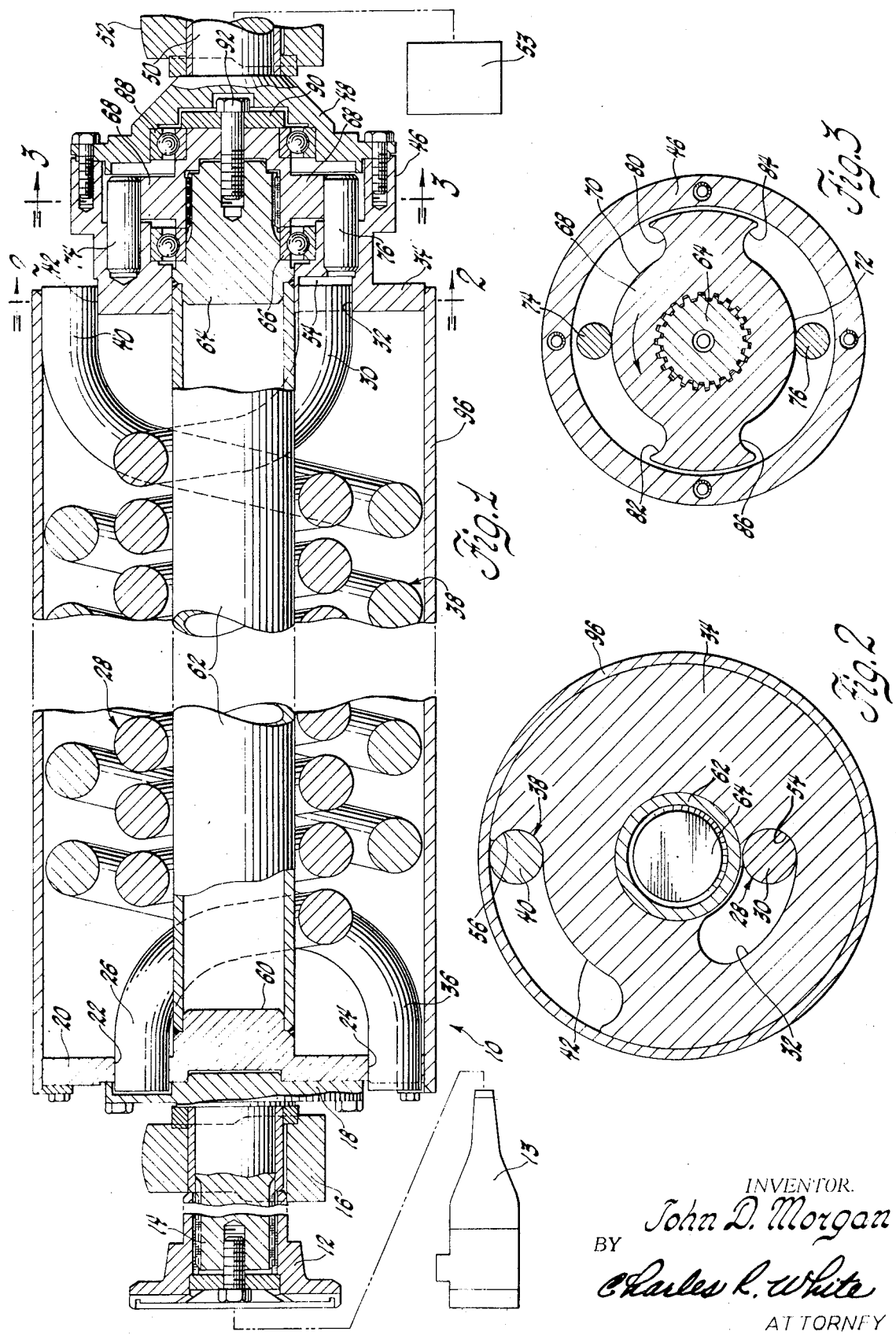
INVENTOR.
John D. Morgan
BY
Charles R. White
ATTORNEY

FLEXIBLE TORQUE TRANSMITTING UNIT

This invention relates to transmissions and more particularly to a torque transmitting unit having a flexible drive connection between input and output members to simulate the torsional characteristics of a vehicle drive line.

In test work, it is generally desirable to operate a particular device or unit being tested in the combination in which it is intended to function to provide for accurate and revealing tests. For example, when power transmissions for vehicles are tested and calibrated, it is desirable to employ a normal-length propeller shaft, differential shafting and ground contacting means in the drive line between the transmission and test load so that the torsional properties appearing in the driven propeller shaft and the rest of the drive line are experienced by the transmission. However, in laboratories where space limitations frequently do not permit the use of normal-length propeller shafts, differential shafting and ground wheels to the load, it is necessary to shorten the shaft between the transmission and load; this increases the rigidity of the drive line and reduces torsional deflection. Such changes in operating characteristics often detract from transmission calibration, tests and test results.

With this invention there is provided a new and improved flexible drive unit which is not only sufficiently short in length for laboratory work but also has torsional characteristics that closely simulate those of a vehicle drive line including the normal-length propeller shaft, differential shafting and wheels. The torque transmitting unit of the preferred embodiment of this invention incorporates helical spring means, which tend to windup when transmitting torque between an input and a load so that a transmission or other drive unit driving the input is subjected to the torsional characteristics of a particular drive line.

In the preferred embodiment of this invention the spring means incorporates a first helical spring with a right-hand lead to simulate the torsional deflections of a drive line when a counterclockwise torque is applied to the input. A second helical spring with a left-hand lead simulates the torsional deflection of a vehicle drive line when a clockwise torque is applied to the input. To provide for the selective utilization of these springs the output member has slot means which allow the end of the spring, which is not being employed in the drive, to float to an inactive position so that only the appropriate spring will transmit torque and simulate the torsional deflection of the drive line.

It is an object of this invention to provide a new and improved torque transmitting unit which drivingly connects input and output members by spring devices which simulate the torsional characteristics of a known drive line for a vehicle.

Another object of this invention is to provide a new and improved flexible and highly compact drive unit which can be employed between a transmission and a load to simulate the torsional properties of a substantially longer drive line normally employed between a transmission and load.

Another object of this invention is to provide a new and improved flexible drive unit which incorporates left and right-hand lead helical springs which simulate torsional deflections of a propeller shaft in response to the application of torque in either direction to an input member of the unit.

Another object of this invention is to provide a drive unit which connects a vehicle transmission to a load which is substantially shorter than a normal propeller shaft but which simulates its torsional deflection thereby permitting improved transmission testing operation and calibration in confined quarters.

These and other objects of this invention will become more apparent from the following description and drawing in which:

FIG. 1 is a side view partly in section of a preferred embodiment of this invention.

FIG. 2 is a view taken along lines 2—2 of FIG. 1.

FIG. 3 is a view taken along lines 3—3 of FIG. 1.

As shown in FIG. 1 there is a torque transmitting unit 10 having a rotatable input member 12 driven by a power package 13 formed by an engine and transmission. Member 12 is splined to an axially-extending shaft 14 rotatably mounted in support 16. The shaft 14 terminates in an annular connector plate 18 that is fastened by bolts to an annular drive disc 20. This disc is formed with a pair of apertures 22 and 24. Aperture 22 receives the end or tang 26 of a helical spring 28 with a right-hand lead that extends axially in the unit 10 and terminates in a tang 30, which is disposed in an arcuate slot 32 formed in an end plate 34 longitudinally spaced from the drive disc 20.

Aperture 24 receives the end or tang 36 of a helical spring 38 having a left-hand lead, which extends axially in the unit and which surrounds the helical spring 28. This spring terminates in an end tang 40 that extends into an arcuate slot 42 located in the end plate 34.

The end plate 34 has an extending side wall 46 to which is attached a hub member 48 that has an axially-extending output shaft 50, which is rotatably mounted in a support 52. The output shaft is adapted to be connected to a dynamometer or other power absorbing unit 53. As shown best by FIG. 2, the end tang 30 of the inner spring 28 is disposed against an end wall 54 of arcuate slot 32. The end tang 40 of helical spring 38 is disposed against an end wall 56 of arcuate slot 42. This construction provides for the windup or loading of the springs to be done individually in accordance with direction of torque applied to the input member 12.

If the input is driven counterclockwise and the output is retarded from rotation by the load, torque will be transmitted to the end plate 34 by the spring 28 with tang 40 driving against end wall 54. The windup or tightening of the spring 28 simulates or duplicates the torsional characteristic of a particular drive line connecting a transmission to a load. During this time the outer spring 38 will be turned in a counterclockwise direction but this spring will not be active since the turning movement is accommodated without reaction by the movement of the tang 36 in arcuate slot 42 to a position intermediate to the ends of the slot.

In the event the load, such as a rotating flywheel in dynamometer 53 overruns the counterclockwise drive from spring 28, there is a back drive through contact surface 56 engaging the end 36 of outer spring 38. Spring 38 will torsionally deflect to simulate the torsional characteristics of the drive line.

If the input 12 is driven clockwise by power package 13 and if the rotation of shaft 50 is limited by dynamometer 53, the torque will be transmitted to the end plate 34 by the outer spring 38 with the tang 36 driving clockwise against the end wall 56. The action of spring 38 as it winds will simulate the torsional characteristics of a known drive line driving a load. The inner spring 28 will be turned in a clockwise direction, however, the arcuate slot 32 has a sufficient arc to accommodate the turning movement of the inner spring so that it does not affect the torsional characteristics of the unit for the clockwise drive.

In the event the load, such as a rotating flywheel in dynamometer 53 overruns the clockwise drive from spring 38, there is a back drive through contact of surface 54 to spring 28 which deflects to simulate the torsional characteristics of the drive line.

To provide for durability and stability of this unit, the input disc 20 is formed with a central pilot 60 onto which a torque transmitting tube 62 is securely mounted. This tube extends axially within the coils with spring 28 and carries a head member 64 at its far end which is mounted within end plate 34 by anti-friction bearings 66. The head member 64 carries a drive disc 68, which has arcuate recesses 70 and 72, which accommodate the projecting ends of torque reaction pins 74 and 76, which are fixed to and project from the end plate 34. FIG. 3 shows the pins 74 and 76 in their neutral position within the arcuate recesses 70 and 72. Pin 74 is spaced between the end surfaces 80 and 82 defining the recess 70. Pin 76 is spaced between the end surfaces 84 and 86 defining the arcuate recess 72. This construction prevents the overload and possible damage to the springs 28 and 38 by drives from the input or the load.

Assuming that there is a counterclockwise drive from the input, the end surfaces 80 and 86 will contact the torque reaction pins 74 and 76 after sufficient deflection of spring 28 to provide a solid drive from the input to the output to prevent damage such as spring set to the spring 28. Deflection of spring 38 from counterclockwise overrun of the input by the load is limited by contact of pins 74 and 76 with surfaces 82 and 84 of disc 68. In the event of clockwise drive from the input the surfaces 82 and 84 will contact the torque reaction pins 74 and 76 respectively to provide a solid drive after deflection of the spring 38. Deflection of spring 28 from clockwise overrun of the input by the load is limited by contact of pins 74 and 76 with surfaces 82 and 84 of disc 68.

As shown in FIG. 1 the drive disc 68 is rotatably supported in hub member 48 by anti-friction bearings 88 and 66. The drive disc 68 is retained on the head member by a spacer 90 and bolt means 92. An outer drum 96 is fixed to disc 20 and extends axially over the spring 38 to provide a protective cover and radial support for spring 38.

With this invention a transmission may be coupled to a load in laboratory setups to improve the testing of components such as the transmission or engine since the helical springs can be selected to closely approximate the torsional deflections of a vehicle drive line and ground wheels. With the operating characteristics of the components resembling those of actual components, the test results will be close to an actual field test. If desired, torsion bars can be substituted for the springs 28 and 38 with good results.

Although a particular embodiment of this invention has been shown and described for purposes of illustrating the invention, it will be appreciated that other embodiments will be readily apparent to those skilled in the art. This invention is not to be limited by the particular embodiment shown and described but by the following claims:

What is claimed is:

1. In a flexible torque transmitting unit, a rotatable input member, an output member longitudinally spaced from said input member, separate first and second spring means operatively disposed between said members for drivingly connecting said input member to said output member, one of said members having first connector means for operatively connecting one end of said second spring means to said last mentioned member so that a clockwise torque load applied to said input member positions said second spring means in an inactive position relative to said members while said first spring means torsionally deflects and solely transmits all torque to said output member, one of said members having second connector means for operatively connecting one end of said first spring means to said last mentioned member so that a counterclockwise torque load applied to said input member positions said first spring means in an inactive position relative to said member while said second spring means torsionally deflects and solely transmits all torque to said output member.

2. In a torque transmitting unit for replacing and simulating the torsional characteristics of a drive line that includes an elongated propeller shaft, a rotatable input member, an output member for driving a load, separate first and second spring means operatively disposed between said members for drivingly connecting said input member to said output member, said output member being formed with first and second slots, said first spring means having an end tang which extends into said first slot and into contact with one end thereof, said second spring means being formed with an end tang which extends into said second slot and into contact with one end thereof, said second slot having a length which permits said end tang of said second spring means to move away from contact with the end portion thereof to an inactive position in response to a clockwise rotation of said input member to permit said input member to drive said output member through said first spring means alone, said first slot having a length which permits said end tang of said first spring means to move away from contact with the end portion thereof to an inactive position in response to the counterclockwise rotation of said input member to permit said input member to drive said output member through said second spring means alone.

3. In a torque transmitting unit for replacing and simulating the torsional characteristics of a propeller shaft comprising a rotatable input member, a carrier member operatively attached to said input member, an output member laterally spaced from said carrier member, first helical spring means having a right-hand lead with one end connected to said carrier member and having a projecting end portion, said output member having slot means with a length substantially greater than the width of said projecting end portion of said spring means, second helical spring means having a left-hand lead with one end secured to said carrier member and having a projecting end portion, said output member having second slot means with a length substantially greater than the width of the projecting end portion of said second spring means whereby drive torque applied clockwise to said input member will move the end of said second spring means to a position between the ends of said second slot means and so that input torque will be transmitted solely by said first spring means through one end of said first slot means to said output member with said first spring means deflecting to simulate the torsional characteristics of an elongated propeller shaft and whereby counterclockwise drive torque applied to said input member will move the end of said first spring means to a position between the ends of said first slot means and so that input torque will be transmitted solely by said second helical spring means through one end of said second slot means to said output member with said second spring means deflecting to simulate the torsional characteristics of the propeller shaft, and stop means operatively connected to said input member for contacting said output member in response to predetermined torsional deflection of either of said spring means to limit the deflection and torque transmitted by either of said spring means.

4. A flexible torque transmitting unit for simulating the torsional characteristics of a drive line connecting a transmission output to a load comprising a rotatable input member adapted to be driven by a transmission, a rotatable output member for driving a load, a carrier member connected to said input member, first and second spring means drivingly connecting said carrier member to said output member, each of said spring means having an extending end portion, first and second slot means in said output member for receiving the respective end portions of said first and second spring means, said first and second slot means having a contact surface at one end thereof to contact the respective end portions of said springs and having a length to permit translational movement of the respective end portions therein so that one of said spring means can drive said output member through said associated contact surface and to permit said output to overrun said input and said last-mentioned spring means and drive said input through the other contact surface and the other of said spring means.

5. In a transmission testing apparatus, a flexible torque transmitting unit for replacing and simulating the torsional characteristics of a known vehicle drive line, said unit being dimensioned to permit the testing of a transmission in confined quarters and comprising a rotatable input member adapted to be driven by said transmission, a rotatable output member for driving a load, first and second spring means drivingly connecting said input member to said output member, said output member having first and second elongated slot means therein with a drive surface at one end thereof, each of said spring means having a drive tang operatively disposed in said associated slot means and against said associated drive surface, said slot means having sufficient clearance to permit movement of said associated tang from contact with said surface so that torque applied in a first direction to said input member will load said only first spring means to drive said output and turn said second spring means in a direction away from contact with the drive surface of said second slot means and so that torque applied in a second direction to said input member will load only said second spring means to drive said output and turn said first spring away from contact with the drive surface of said second slot.

6. A flexible torque transmitting unit for replacing and simulating the torsional characteristics of a known vehicle drive line leading from a transmission output to a load which is substantially shorter than the known vehicle drive line to permit the testing of the transmission in confined quarters comprising a rotatable input member driven by a transmission and a rotatable output member for driving a load, first helical spring means having a right-hand lead drivingly connecting said input member to said output member, said first helical spring means having a driving tang at one end thereof, elongated slot means formed in said output member for receiving said driving tang, second helical spring means having a left-hand lead drivingly connecting said input member to said output member, said second helical spring means having a driving tang, said output means having an elongated slot formed therein for receiving said driving tang and to permit said driving tang to move to an inactive position in response to the rotation of said input in one direction and to permit the driving tang to accommodate said driving tang when torque is being transmitted through the other of said spring means.

7. The flexible torque transmitting unit defined in Claim 6 and further including a supporting shaft driven directly by said input and extending through said unit and axially through said helical springs, said shaft having a driving head secured thereto, said output having a torque reaction pin projecting therefrom into said driving head, said driving head having spaced drive surfaces thereon which contact said torque reaction pin after predetermined deflection of said spring means to transmit the drive mechanically from said input to said output without further deflection of either of said spring means.

* * * * *